US010265820B2

(12) United States Patent
Widmann et al.

(10) Patent No.: US 10,265,820 B2
(45) Date of Patent: Apr. 23, 2019

(54) MACHINE TOOL HAVING A COVERING HOOD GUIDED IN A DISPLACEABLE MANNER ON A SLIDE GUIDE RAIL

(71) Applicant: TRUMPF Laser- und Systemtechnik GmbH, Ditzingen (DE)

(72) Inventors: Dominik Widmann, Bad Liebenzell (DE); Dietrich Sauter, Metzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 442 days.

(21) Appl. No.: 15/072,568

(22) Filed: Mar. 17, 2016

(65) Prior Publication Data

US 2016/0193707 A1 Jul. 7, 2016

Related U.S. Application Data

(63) Continuation of application No. PCT/EP2014/067658, filed on Aug. 19, 2014.

(30) Foreign Application Priority Data

Sep. 17, 2013 (DE) ........................ 10 2013 218 598

(51) Int. Cl.
*B23Q 11/08* (2006.01)
*B23K 26/08* (2014.01)
(Continued)

(52) U.S. Cl.
CPC ...... *B23Q 11/0875* (2013.01); *B23K 26/0876* (2013.01); *B23Q 1/012* (2013.01);
(Continued)

(58) Field of Classification Search
CPC ............ B23K 26/0876; B23Q 11/0875; B23Q 1/012; B23Q 1/015; F16C 29/005; F16C 29/086; F16C 29/088; F16C 2322/39
See application file for complete search history.

(56) References Cited

U.S. PATENT DOCUMENTS

| 5,871,283 A | * | 2/1999 | Isobe | ................. B23Q 11/0825 384/15 |
|---|---|---|---|---|
| 8,466,388 B2 | | 6/2013 | Zeygerman | |
| 2010/0301020 A1 | * | 12/2010 | Phillip | ................... B23K 10/00 219/121.44 |

FOREIGN PATENT DOCUMENTS

| CN | 102378665 B | 1/2015 |
|---|---|---|
| DE | 19739711 A1 | 3/1999 |

(Continued)

OTHER PUBLICATIONS

International Search Report from corresponding PCT Application No. PCT/EP2014/067658, dated Jan. 15, 2015, 4 pages.

(Continued)

*Primary Examiner* — Brian W Jennison
(74) *Attorney, Agent, or Firm* — Fish & Richardson P.C.

(57) ABSTRACT

In a machine tool, in particular a laser machine tool, a workpiece slide or tool slide is movable along a guide rail and has at least two guide carriages that are guided on the guide rail. The machine tool has a covering hood that is moved along with the slide, for covering that rail section of the guide rail that is located between the two guide carriages. The covering hood is a part that is not connected to the slide. The covering hood is guided on the guide rail in a displaceable manner between the two guide carriages and is entrained in the displacement direction by the rear guide carriage when the slide is displaced.

11 Claims, 2 Drawing Sheets

(51) Int. Cl.
*F16C 29/08* (2006.01)
*B23Q 1/01* (2006.01)
*F16C 29/00* (2006.01)

(52) U.S. Cl.
CPC ............ *B23Q 1/015* (2013.01); *F16C 29/005* (2013.01); *F16C 29/086* (2013.01); *F16C 29/088* (2013.01); *F16C 2322/39* (2013.01)

(56) References Cited

FOREIGN PATENT DOCUMENTS

| DE | 19860027 A1 | 7/2000 |
| JP | 2001263350 | 9/2001 |
| JP | 2006317006 A | 11/2006 |

OTHER PUBLICATIONS

Notification of Transmittal of Translation of the International Preliminary report on Patentability and the Written Opinion of the International Search Authority for corresponding PCT Application No. PCT/EP2014/067659, dated Mar. 22, 2016, 6 pages.

* cited by examiner

MACHINE TOOL HAVING A COVERING HOOD GUIDED IN A DISPLACEABLE MANNER ON A SLIDE GUIDE RAIL

CROSS-REFERENCE TO RELATED APPLICATIONS

This application is a continuation of and claims priority under 35 U.S.C. § 120 to PCT Application No. PCT/EP2014/067658 filed on Aug. 19, 2014, which claims priority to German Application No. DE 10 2013 218 598.7, filed on Sep. 17, 2013. The contents of both of these priority applications are hereby incorporated by reference in their entireties.

TECHNICAL FIELD

The invention relates to a machine tool, and in particular a laser machine tool, comprising a workpiece slide or tool slide that is movable along a guide rail.

BACKGROUND

In the context of the invention, a machine tool is also understood to mean a laser machine tool in which a laser beam emerges from a laser machining head that is fastened to a movable slide and forms the laser tool.

Slides of a machine tool are frequently guided along a guide rail by way of ball screw units or recirculating roller units. The guide systems that are generally used consist of the guide rail and one or more guide carriages. Larger tool slides are generally guided on two guide rails, wherein two or more guide carriages are arranged on each guide rail. The guide carriages are sealed off with respect to the guide rail by radial and longitudinal wipers that are intended to prevent dirt from penetrating into the guide carriage. Dirt that drops onto the guide rail outside the slides is entrained by the external radial wipers of the guide carriages and deposited at the rail end. This dirt that is deposited at the rail end is no longer traveled over by the guide carriage and thus cannot pass into a guide carriage. Dirt that passes between two guide carriages cannot be transported to the rail end, but is entrained by the radial wiper of one guide carriage and deposited on the guide rail during the movement of the slide in one direction. When the slide moves in the opposite direction, the dirt is entrained by the radial wiper of the other guide carriage. In this way, the dirt is pushed back and forth between the guide carriages. As a result of the dirt being pushed aside, the radial wipers are subjected to high loading and become worn quickly, such that the dirt gets past the radial wipers and into the interior of the guide carriages and the guide carriages as a whole can fail. It can be very complicated to replace the guide carriages.

To prevent dirt from passing between the two guide carriages and onto the guide rail, covering hoods, which are fitted on the two guide carriages and cover the that rail section of the guide rail that is located in between, are known (for example JP2006317006). The covering hoods are usually made of steel and have internal rubber lips as longitudinal and radial wipers. However, during the relatively complicated fitting and removal of the covering hood, the covering hood or the connection structure can be damaged.

SUMMARY

Various aspects of the invention relate to laser machine tools that includes a workpiece slide or tool slide that is movable along a guide rail and has at least two guide carriages that are guided in a movable manner on the guide rail, and a covering hood, moved along with the slide, for covering that rail section of the guide rail that is located between the two guide carriages. Aspects of the invention make it easier to fit and remove the covering hood in a laser machine tool and help prevent damage to the covering hood or the connection structure.

In some embodiments, the covering hood is a part that is not connected to the slide, said part being guided on the guide rail in a displaceable manner between the two guide carriages and being entrained in the displacement direction in each case by the rear guide carriage in the displacement direction when the slide is displaced.

In certain implementations, the covering hood is a separate part that is fitted on the guide rail independently of the slide and the two guide carriages thereof, thereby considerably simplifying the removal of the covering hood and of the guide carriages from the guide rail and precluding damage to the covering hood or the connection structure. The covering hood encloses the guide rail and provides sealing with respect to the guide rail, thereby precluding dirt from passing onto that rail section of the guide rail that is located between the two guide carriages. The covering hood can be formed from any material, in particular also from metal.

In certain implementations, the covering hood is guided in a displaceable manner in lateral guide grooves of the guide rail. In particular, the covering hood is not guided on the same guide grooves as those on which the guide carriages are also guided, but next to the running surfaces that are intended for guiding the guide carriages. This prevents dirt particles or cutting dust from digging into the material of the covering hood and having a similar effect to sandpaper, with the result that the covering hood becomes worn. The covering hood engages laterally around the guide rail and entirely covers at least the lateral guide grooves of the two guide carriages with its two side walls.

In some implementations, the covering hood rests against the guide rail with the two free longitudinal ends of its side walls being spread apart elastically to press the longitudinal inner edges of the free longitudinal ends against the guide rail as sealing edges or longitudinal wipers.

In certain implementations, the covering hood is formed from plastic materials. On account of the elastic resilience of the plastics materials, the sealing edges of the covering hood are pressed against the guide rail and any wear is compensated. Covering hoods made of plastics materials are, after recovery of the tool costs, considerably more cost-effective than other known solutions. Covering hoods made of plastics materials are also considerably lighter than known covering hoods, with the result that the mass to be accelerated of the machine structure is reduced. Covering hoods made of plastics materials can be produced from only one material which unites all the different requirements placed on the functions of the covering hood. Thus, for example a covering hood made of steel requires a sealing lip made of rubber, since steel has insufficient resilience to achieve a sealing action with respect to the guide rail.

In certain implementations, the covering hood is advantageously formed by a profile formed via plastic extrusion.

In some implementations the covering hood has a profile that is configured to latch on to the guide rail, for example via elastically expanding the covering hood or spreading sides of the hood to fit over the guide rail and allowing the sides to contract or return toward their original position whereby the cover presses against the guide rail and thereby latches onto the guide rail.

In some implementations the covering hood is configured to be pushed onto the guide rail from an end of the guide rails, for example from a front-side rail end.

Further advantages of the invention can be gathered from the claims, the description and the drawing. Likewise, the abovementioned features and those that are set out below can each be implemented individually or jointly in any desired combinations. The embodiment that is shown and described should not be understood as being a definitive list but rather as an example for outlining the invention.

DETAILED DESCRIPTION

Figure 1:
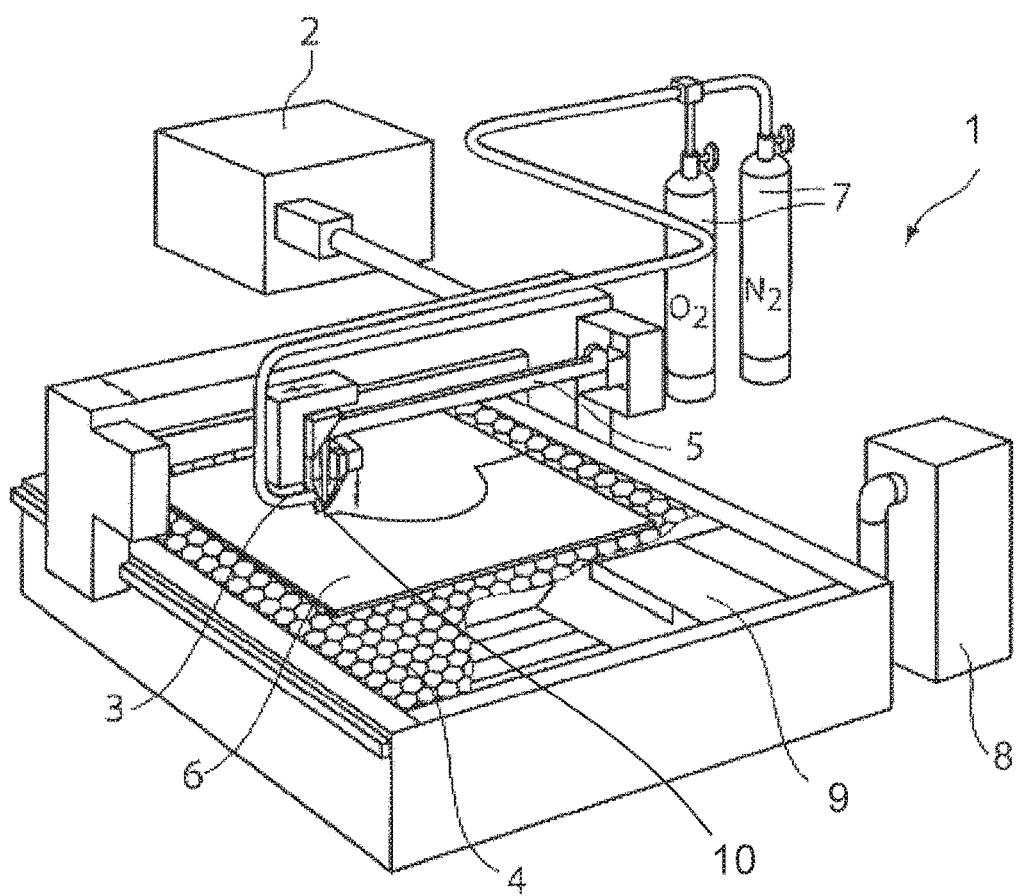
FIG. 1 shows a laser machine tool according to an exemplary embodiment of the invention.

FIG. 1 shows a perspective view of a machine tool 1 that shows the structure of a laser cutting machine as an exemplary embodiment of a laser machine tool. Further exemplary embodiments are, for example, a laser welding machine or a combined punching/laser cutting machine. This machine tool 1 has, for example, a $CO_2$ laser, diode laser or solid-state laser as the laser beam generator 2, a movable laser machining head 3 and a workpiece support 4. In the laser 2, a laser beam 5 is generated and guided from the laser 2 to the machining head 3 by means of an optical fiber (not shown) or deflection mirrors (not shown). Arranged on the workpiece support 4 is a workpiece 6. The laser beam 5 is directed onto the workpiece 6 by means of focusing optics arranged in the machining head 3. The machine tool 1 is furthermore supplied with process gases 7, for example oxygen and nitrogen. Alternatively or in addition, compressed air or application-specific gases can be provided. The use of the individual gases is dependent on the material of the workpiece 6 to be machined and on the quality requirements placed on the cut edges. Furthermore, provision is made of a suction device 8 connected to a suction duct 9 located under the workpiece support 4. The process gas 7 is fed to a process gas nozzle 10 of the machining head 3, from which it emerges together with the laser beam 5.

Figure 2:
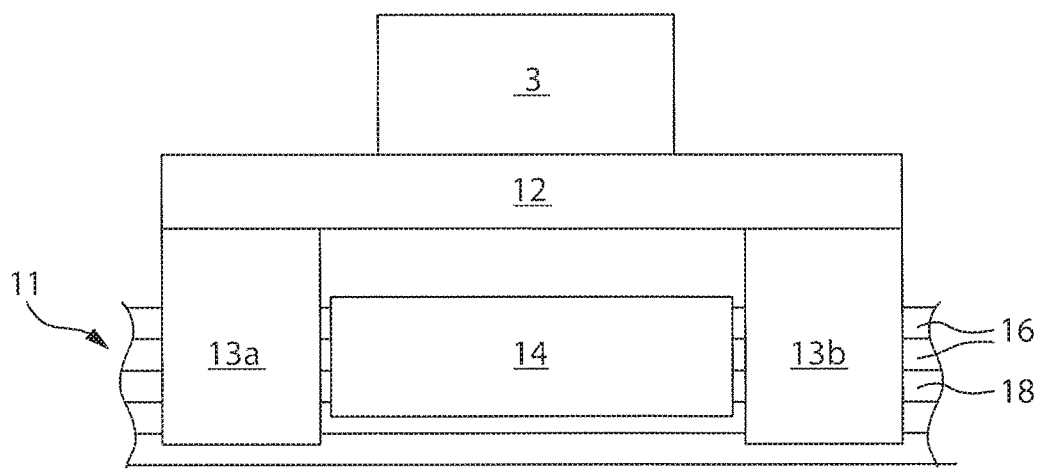
FIG. 2 shows a side view of a slide of the laser machine tool where the slide is movable along a guide rail, and of a covering hood that moves along with the slide.

As shown in FIG. 2, the machining head 3 is fastened to a slide 12 that is movable along a horizontal guide rail 11. Slide 12 has two guide carriages 13a, 13b that are guided in a movable manner on the guide rail 11. A covering hood 14 that moves along with the slide 12 serves to cover that rail section of the guide rail 11 that is located between the two guide carriages 13a, 13b. The covering hood 14 is not connected to the slide 12 or to the guide carriages 13a, 13b, but is a separate part that is guided on the guide rail 11 in a displaceable manner between the two guide carriages 13a, 13b. When the slide 12 is displaced, the covering hood 14 is entrained in the displacement direction in each case by the rear guide carriage in the displacement direction. Thus, if the slide 12 is displaced, for example, toward the right in FIG. 2, the covering hood 14 is entrained toward the right by the left-hand guide carriage 13a. If the slide 12 is displaced toward the left, the covering hood 14 is entrained toward the left by the right-hand guide carriage 13b.

Figure 3:
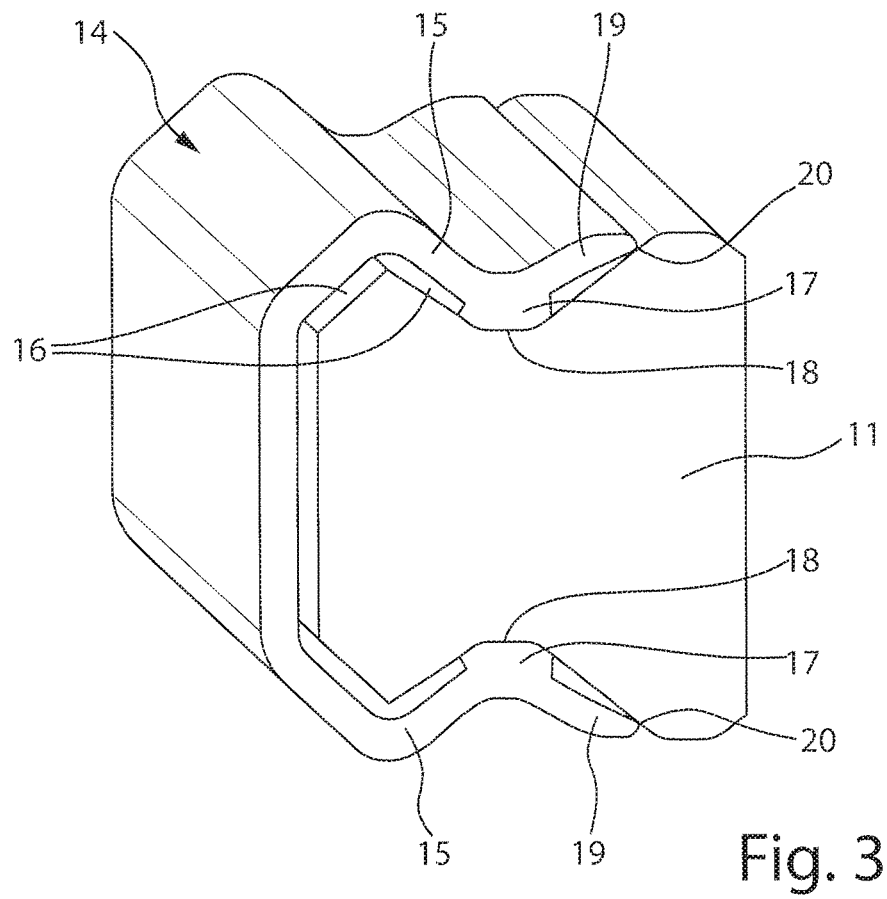
FIG. 3 shows a front-side view of the covering hood that is guided in a displaceable manner on the guide rail.

As shown in FIG. 3, the covering hood 14 engages laterally around the guide rail 11 and completely covers, with its two side walls 15, the lateral running surfaces 16 of the guide rail 11, along which the guide carriages 13a, 13b are guided. The side walls 15 have inwardly protruding or angled guide protrusions 17 that engage in lateral guide grooves 18 of the guide rail 11 and are guided in a displaceable manner therein. The covering hood 14 is preferably a profile formed via a plastic extrusion manufacturing process. The extruded profile of the covering hood 14 configures the covering hood 14 to latch onto the guide rail 11, for example, via elastically expanding the covering hood 14 by spreading the side walls 15 of the hood to fit over the lateral running surfaces 16 of the guide rail 11 and allowing the side walls 15 to contract or return toward their original position once the guide protrusions 17 engage groove 18 and thereby latches onto the guide rail 11. In some implementations the covering hood 14 may be configured to be pushed onto the guide rail 11 via the front-side rail end, for example substantially with elastically expanding. On account of the elastic resilience of the plastic materials, the sealing edges of the covering hood 14 are pressed against the guide rail 11 and any wear is compensated. Covering hoods made of plastic materials are, after recovery of the tool costs, considerably more cost-effective than other known solutions. In certain embodiments, the covering hood is made of POM (polyoxymethylen). Covering hoods made of plastic materials are also considerably lighter than known covering hoods, with the result that the mass to be accelerated of the machine structure is reduced. Covering hoods made of plastic materials can be produced from only one material that unites all the different requirements placed on the functions of the covering hood. Thus, for example, if the covering hood 14 is made of steel, the covering hood 14 can include a sealing lip made of rubber, since steel has insufficient resilience to achieve a sealing action with respect to the guide rail 11.

The covering hood 14 bears against the guide rail 11 with the longitudinal inner edges 20 of the free longitudinal ends 19, with the two free longitudinal ends 19 of its side walls 15 being spread apart elastically. The longitudinal inner edges 20 thus form sealing edges or longitudinal wipers that are pressed against the guide rail 11 by the restoring force of the elastically spread-apart longitudinal ends 19.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool, comprising:
   a slide for at least one of a workpiece and a tool, wherein the slide is movable along a guide rail and comprises at least two guide carriages that are guided on the guide rail; and
   a covering hood configured to move along with the slide for covering a rail section of the guide rail that is located between the two guide carriages, wherein the covering hood is not connected to the slide or the guide carriages, is guided on the guide rail in a displaceable manner between the two guide carriages, and is entrained in the displacement direction by the respective rear guide carriage in the displacement direction when the slide is displaced.

2. The machine tool of claim 1, wherein the covering hood engages laterally around the guide rail and covers at least lateral running surfaces of the guide rail, wherein the guide carriages are guided on the running surfaces.

3. The machine tool of claim 1, wherein the covering hood is guided in a displaceable manner on lateral guide grooves of the guide rail.

4. The machine tool of claim 1, wherein the covering hood includes a longitudinal wiper at each of the free longitudinal ends of two side walls of the covering hood, wherein the longitudinal wipers rest against the guide rail.

5. The machine tool of claim 4, wherein the longitudinal wipers are each formed by a longitudinal inner edge of the side walls of the covering hood.

6. The machine tool of claim 1, wherein the covering hood rests against the guide rail with the two free longitudinal ends of side walls of the covering hood being spread apart elastically.

7. The machine tool of claim 1, wherein the covering hood is formed from a plastic material.

8. The machine tool of claim 1, wherein the covering hood is formed into a profile by extrusion.

9. The machine tool of claim 1, wherein the covering hood is configured to be forcibly and elastically expanded to fit onto the guide rail and thereby latch onto the guide rail upon a contraction.

10. The machine tool of claim 1, wherein the covering hood is configured to be pushed onto the guide rail via a front-side rail end.

11. The machine tool of claim 1, wherein the tool includes a laser.

\* \* \* \* \*